United States Patent [19]

Kobashi et al.

[11] Patent Number: 4,753,753

[45] Date of Patent: * Jun. 28, 1988

[54] CHEMICALLY STABLE AQUEOUS ANTIMONY OXIDE SOL

[75] Inventors: Toshiyuki Kobashi; Hideo Naka, both of Okayama, Japan

[73] Assignee: Japan Exlan Company, Limited, Osaka, Japan

[ * ] Notice: The portion of the term of this patent subsequent to Aug. 6, 2002 has been disclaimed.

[21] Appl. No.: 925,265

[22] Filed: Oct. 31, 1986

[30] Foreign Application Priority Data

Nov. 26, 1985 [JP] Japan .................................. 60-266742
Nov. 26, 1985 [JP] Japan .................................. 60-266866

[51] Int. Cl.$^4$ .............................................. B01J 13/00
[52] U.S. Cl. .................................. 252/309; 252/313.1; 252/610; 106/18.28
[58] Field of Search .................... 252/313.1, 309, 610; 423/617; 106/18.28, 287.13, 287.14, 287.15

[56] References Cited

U.S. PATENT DOCUMENTS

| | | | |
|---|---|---|---|
| 3,689,300 | 9/1972 | Bunger et al. | 106/287.15 X |
| 3,860,523 | 1/1975 | Petrow et al. | 252/313.1 X |
| 3,960,989 | 6/1976 | Petrow et al. | 252/610 X |
| 4,026,819 | 5/1977 | Langere et al. | 252/313.1 |
| 4,028,266 | 6/1977 | Langere et al. | 252/313.1 X |
| 4,102,703 | 7/1978 | Tully | 252/309 X |
| 4,533,538 | 8/1985 | Kobashi et al. | 423/617 |
| 4,571,365 | 2/1986 | Ashlock et al. | 106/287.14 X |

FOREIGN PATENT DOCUMENTS 62340  5/1977  Japan .............................. 106/287.15

OTHER PUBLICATIONS

Stewart et al., "Pyrochlores. VII. The Oxides of Antimony: An X-ray and Mossbauer Study", *Canadian Journal of Chemistry*, vol. 50(1972) pp. 690–700.

*Primary Examiner*—Matthew A. Thexton
*Attorney, Agent, or Firm*—Wenderoth, Lind & Ponack

[57] ABSTRACT

This invention provides an aqueous antimony oxide sol composed of $Sb_6O_{13}$, 1 to 100 m$\mu$ in particle diameter, dispersed in an aqueous medium or composed of said $Sb_6O_{13}$ treated with a particular quantity of a particular organic silicon compound and regulated to within a prescribed pH range, which has a high concentration and a small quantity of impurities, and moreover has excellent thermal stability and chemical stability.

6 Claims, No Drawings

CHEMICALLY STABLE AQUEOUS ANTIMONY OXIDE SOL

BACKGROUND OF THE INVENTION (a) Field of the Invention

This invention relates to an aqueous hexaantimony tridecaoxide ($Sb_6O_{13}$) sol having fine particle diameters and excellent stability.

(b) Description of the Prior Art

Since antimony oxide has an ability for making fabrics, fibers, plastic materials, etc. flame retardant, it has been used together with flame retardants such as organic chlorides, or other halogen-containing substances, as a flame retarding synergistic agent to improve the flame retarding effect. However, since all of the conventional antimony oxides are composed of large particles having particle diameters of the size of pigments, there was a defect of worsening the touch, transparency and other physical properties of the product in which such an antimony oxide was used. In order to obviate such a defect, in recent years there have been studied methods for obtaining antimony oxide in fine particle form. Examples of known methods are: a method of producing a colloidal sol of antimony pentoxide ($Sb_2O_5$) having particle diameters of from 2 to 100 m$\mu$, wherein antimony trioxide ($Sb_2O_3$) is reacted with potassium hydroxide and hydrogen peroxide ($H_2O_2$) in the ratio of about 1:2.1:2 mol to form potassium antimonate, followed by deionization to form said colloidal sol (refer to Japanese Patent Publication No. 11848/1982), and a method of producing aqueous antimony pentoxide colloidal sol, wherein a mixture of antimony trioxide, hydrogen peroxide and water is subjected to reflux for one hour and then the mixture is cooled to form said colloidal sol (refer to Japanese Patent Kokai (Laid-open) No. 123997/1977).

On the other hand, it has been known from old times that the above-mentioned $Sb_2O_5$, when heated, decomposes to liberate oxygen, and at temperatures between 780° and 920° C., it transforms into hexaantimony tridecaoxide ($Sb_6O_{13}$), and at higher temperatures, antimony tetraoxide ($Sb_2O_4$) is generated (refer to Muki Kagaku Zensho IV-4, Maruzen Co. Ltd., published on May 25, 1954, pp 168–170).

Since the production of $Sb_2O_5$ colloidal sol by the known former method (Japanese Patent Publication No. 11848/1982) uses a large quantity of potassium hydroxide, potassium hydroxide remains as an impurity in the reaction product. Therefore, to remove this impurity, this method necessitates a deionization step. Furthermore, in this known production method, when the reaction is carried out at a high concentration, the diameters of the resulting particles become large, so that it is necessary to keep the $Sb_2O_5$ in the colloidal sol at a low concentration. Moreover, in order to obtain a high concentration product having sufficient commercial value, an additional evaporation step is required. Thus the method comprises a large number of troublesome process steps. In the latter method (Japanese Patent Kokai (Laid-open) No. 123994/1977), no alkali substance is added and therefore there is no problem of impurity removing operation. However, the reaction speed is very slow, so that it is necessary to carry out the reaction at a high temperature near the boil. Thus there may be a danger of bumping during the reaction. Moreover, once the reaction is initiated, the reaction system is rapidly brought to a high temperature by the reaction heat. This makes the temperature control difficult. Therefore, not only it is impossible to enlarge the production scale, but also high costs of installation and energy are inevitable. Further, $Sb_2O_5$ thermally decomposes at relatively low temperatures as previously mentioned, so that its thermal stability is not sufficient. When it is used for melt molding of plastics, bubbles formed by the liberation of oxygen lower the physical properties of the molded product and also worsen the appearance. In addition, the $Sb_2O_5$ colloidal sol, when used in mixture with various latexes, it aggregates by the inorganic salt contained in the latex. That is to say the colloidal sol is not chemically stable.

On the other hand, $Sb_6O_{13}$ is produced as an intermediate oxide upon producing $Sb_2O_4$ by heating $Sb_2O_5$, as mentioned in the above literature. Even if an aqueous fine particle $Sb_2O_5$ sol is used as the starting material, the primary particles aggregate and unite to form large particles in the production process, especially in the drying step. Even if the aggregated particles are ground, only large diameter particles of the size of pigments are obtained. Accordingly, an aqueous sol containing $Sb_6O_{13}$ of fine particle diameters has not been known.

We have previously invented, as an improved method of producing the above-mentioned known $Sb_2O_5$ colloidal sol, a method of producing colloidal antimony oxide, wherein $Sb_2O_3$, hydrogen peroxide and an inorganic alkali substance are reacted in mixture in the mol ratio of 1:1.25 or more: 0.015–0.3 (refer to Japanese Patent Kokai No. 23291/1984 and Japanese Patent Kokai No. 137828/1985). As a result of subsequent research, it has been found that, in the above-mentioned invention, the colloidal antimony oxide obtained by limiting the mol ratio of hydrogen peroxide to a particular range and by selecting a particular inorganic alkali substance, is an aqueous $Sb_6O_{13}$ sol, and that this aqueous sol has excellent chemical stability.

SUMMARY OF THE INVENTION

This invention is an aqueous $Sb_6O_{13}$ sol characterized in that particles of $Sb_6O_{13}$ having particle diameters of from 1 to 100 m$\mu$ are dispersed in an aqueous medium, and the aqueous sol of this invention is obtained by heating an aqueous dispersion of $Sb_2O_3$, hydrogen peroxide and a particular alkali metal compound mixed in a particular mol ratio. An especially chemically stable aqueous antimony oxide sol of this invention is provided by treating $Sb_6O_{13}$, 1–100 m$\mu$ in particle diameter, with an organic silicon compound represented by the general formula described below, in the ratio of 0.5 to 25 weight % based on Sb, and by regulating the pH to within the range of from 2.5 to 12;

the general formula:

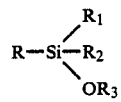

wherein R represents a $C_{1-18}$ substituent group which contains no amino group, mercapto group, methacryloxy group or halogen atom; $R_1$ and $R_2$ each represent a $C_{1-4}$ substituent group, alkoxy-substituted alkyl group or an acetyl group.

DETAILED DESCRIPTION OF THE INVENTION

The $Sb_6O_{13}$ in the aqueous sol of this invention is composed of very fine particles having a particle diameter from 1 to 100 m$\mu$, preferably from 1 to 50 m$\mu$. This particle diameter is values obtained by photographing at 1,000,000 times magnification using an electronic microscope (produced by Hitachi Ltd., type H-800).

Also, the antimony oxide in the aqueous sol was identified as $Sb_6O_{13}$ by the X-ray diffraction pattern of FIG. 2(e) described on page 696 of Canadian Journal of Chemistry, Vol. 50 (1972).

The aqueous $Sb_6O_{13}$ sol of this invention has excellent chemical stability, maintaining a stable aqueous sol state without aggregating in the pH range of from 1.0 to 10.0, especially from 1.5 to 8.0. This chemical stability is judged from the variation of the percent transmission of light of the aqueous sol. The percent transmission of light is a percent value of white light caused to pass through the colloidal sol of 0.4% solid matter concentration, measured by means of Hitachi-101 Spectrophotometer (produced by Hitachi Ltd). The chemical stability is represented by percent transmission of light of a mixture of the colloidal sol and an aqueous 0.5% common salt solution (pH 14), caused to stand for 5 minutes after mixing and stirring. It is shown that the greater the value of this transmission of light, the smaller and less aggregated are the particles.

The aqueous medium in the aqueous sol is water, or an aqueous mixed solvent of water and a water-miscible organic medium such as methyl alcohol, ethyl alcohol, propyl alcohol, acetone, etc., in a quantity within the range not impairing the stability of the aqueous sol.

In order to produce the aqueous sol of this invention, $Sb_2O_3$, hydrogen peroxide and a particular alkali-metal are caused to react in the mol ratio of 1:1.25–1.8:0.0-15–0.3.

The particle diameter of $Sb_2O_3$ is less than 100$\mu$, but it is desirable to be 0.1–10$\mu$ from the viewpoint of the dispersibility in water and the reactivity with hydrogen peroxide. To prepare a dispersion by dispersing the $Sb_2O_3$ in an aqueous medium, the concentration of $Sb_2O_3$ in the dispersion should be 5–40 weight %, preferably 7–25 weight %.

The quantity of hydrogen peroxide to be compounded should be 1.25–1.8 mol for one mol of $Sb_2O_3$. At a quntity less than 1.25 mol, colloidal fine particles cannot be obtained. On the contrary, when the quantity exceeds 1.8 mol, the chemical stability to electrolytes such as inorganic salts lowers, and in addition, unreacted hydrogen peroxide remains in the aqueous sol obtained.

The alkali-metal compounds to be compounded to the $Sb_2O_3$ dispersion are selected from lithium hydroxide, sodium hydroxide, lithium carbonate and sodium carbonate. When using alkali-metal compounds other than these, for example potassium hydroxide, calcium hydroxide, etc., $Sb_6O_{13}$ in fine particle form is not generated. The quantity of the above-mentioned particular alkali-metal compounds to be compounded should be 0.015–0.3 mol, preferably 0.02–0.2 mol, for one mol of $Sb_2O_3$. When the quantity of the alkali-metal compound to be compounded is less than 0.015 mol, the reaction speed becomes slow, so that it is not only necessary to maintain the reaction temperature at a temperature near or above the boiling point of water, but also in a high concentration reaction system, the particle diameter of $Sb_6O_{13}$ obtained becomes large. On the contrary, when the quantity of the alkali-metal compound to be compounded exceeds 0.3 mol, it is impossible to form fine particulate $Sb_6O_{13}$ selectively, and also in a high concentration reaction system, the particle diameter becomes extremely coarse.

The order of compounding $Sb_2O_3$, hydrogen peroxide and alkali-metal compound is not particularly limited. For example, the three materials may be mixed at the same time to form an aqueous dispersion, or hydrogen peroxide may be mixed to an aqueous dispersion of $Sb_2O_3$ and alkali-metal compound.

The temperature for reacting the above-mentioned aqueous dispersion is above 30° C., preferably between 50° and 100° C. But it is possible to initiate the reaction even at a low temperature lower than 50° C., so that not only the energy required for heating the reaction system becomes small, but also the quantity of heat generated by the reaction is almost absorbed as a quantity of heat for elevating the temperature of the reaction system to the boil. Thus, the necessity for cooling from outside is small, and there is no necessity of temperature control for the prevention of bumping.

The solid matter concentration in the aqueous sol obtained by the above-mentioned reaction is 6–45 weight %, preferably 8–25 weight %, depending upon the concentration of $Sb_2O_3$ in the aqueous dispersion. However, if necessary, by concentrating the aqueous sol, it is possible to form an aqueous sol of solid matter concentration above 45 weight %, without addition of a stabilizer.

To the above-mentioned aqueous sol, a desired quantity of an alkali compound may be added for the regulation of pH.

In the following, we are going to explain in detail about the organic silicon compound of this invention represented by the above-mentioned general formula.

R is a substituent group of $C_{1-8}$, preferably $C_{1-6}$ which contains no amino group, mercapto group, methacryloxy group or halogen atom. When the number of carbon atoms exceeds the upper limit or when R contains any of the above-mentioned functional groups, it is impossible to provide the aqueous $Sb_6O_{13}$ sol of excellent chemical stability which is the aim of this invention. As such a substituent R, there may be mentioned for example, vinyl group, $C_{1-4}$ lower alkyl group, $\gamma$-glycidoxy propyl group, $\beta$-(3,4-epoxycyclohexyl)ethyl group, etc. Among others, vinyl group and $C_{1-4}$ lower alkyl group are desirable.

$R_1$ and $R_2$ are each the same or a different $C_{1-4}$ substituent. For example, there may be mentioned alkyl group such as methyl, ethyl, etc., alkoxy group such as methoxy, ethoxy, etc., alkoxy-substituted alkyl group such as $\beta$-methoxyethyl, etc., alkoxy-substituted alkoxy group such as $\beta$-methoxyethoxy, etc., acetyl group, acetoxy group, etc. Among others, $C_{1-2}$ alkoxy group and acetoxy group are desirable. $R_3$, as far as the number of carbon atoms is less than 4, represents alkoxy-substituted alkyl group or acetyl group as the case may be.

As a method of treatment with the above-mentioned organic silicon compound, there may be mentioned a means which comprises adding to the aqueous $Sb_6O_{13}$ sol, an organic silicon compound in the ratio of 0.5–25 weight %, desirably 2–15 weight %, and more desirably 3–10 weight %, based on the Sb in said sol, and causing to react under stirring at a temperature of from 30° to 100° C., preferably from 60° to 100° C., for 10 minutes to 3 hours, preferably for 30 minutes to 1.5 hours. Even if a quantity of the organic silicon compound exceeding the upper limit defined in this invention, not only any more improvement is not attained, but also the use of such a quantity is not desirable from the viewpoint of economy.

In order to improve the stability during storage in the coexistence of an inorganic salt, it is important to regulate the pH value of the aqueous sol after the abovementioned treatment to within the range of from 2.5 to 12, preferably from 5 to 9. Only after such regulation, the chemical stability of the aqueous sol imparted by the treatment with the organic silicon compound can be maintained without change with the passage of time. Since the aqueous sol after synthesis shows a pH value near 2, the pH is advantageously regulated by adding a desired quantity of an alkali substance such as alkali-metal hydroxide, ammonia, amines, etc. Among others, when using as such a pH regulator, a hydroxyl group-containing organic amine such as N-alkyl-substituted or not substituted ethanol amine or diethanol amine, triethanol amine, tris(oxymethyl)ethyl amine, 1,3-diaminopropane-2-ol, etc., no aggregation occurs even when the aqueous sol is concentrated.

We do not fully under stand the reaction mechanisms giving the extremely fine and chemically stable aqueous $Sb_6O_{13}$ sol. However, we suppose that, in the reaction of $Sb_2O_3$ with hydrogen peroxide, the particular alkali-metal compound accelerates the reaction as a catalyst, and by the particular quantity of the alkali-metal compound, $Sb_6O_{13}$ is selectively formed and becomes fine. Also we suppose that a silane-coupling reaction occurs between $Sb_6O_{13}$ and the organic silicon, and as a result, the substituent R existing between the fine particles of $Sb_6O_{13}$ and the disperse medium might play some role in suppressing the aggregation and union of fine particles of $Sb_6O_{13}$ induced by the inorganic salt and latex mixed in the dispersion liquid. We further suppose that when the pH of said dispersion liquid is regulated to within the particular range, such action might be displayed effectively.

The effect of this invention consists in providing an aqueous sol of $Sb_6O_{13}$ having extremely fine particles of the size not known heretofore, which is in high concentration and contains only a small quantity of impurities, and moreover is thermally and chemically stable. Thus the aqueous sol of this invention, when mixed with a spinning solution for fiber formation, is stable without aggregation. Also, on melt-spinning, there is no formation of bubbles caused by heat decomposition. Therefore, there is no problem in operation and impairment of physical properties and appearance. Furthermore, the aqueous $Sb_6O_{13}$ sol of this invention can be used as it is, as shown in the above-mentioned use example, or if desired, it can be used as $Sb_6O_{13}$ particles obtained by concentration or by spray drying, for various fields of use such as flame retarding synergistic agent.

EXAMPLES OF THE PRACTICE OF THE INVENTION

For a better understanding of this invention, examples of the practice of the invention are set forth in the following. However, the gist of the invention is not limited by the description of the examples. Percentages and parts in the examples are shown by weight, unless otherwise indicated.

The stability of the aqueous sol to common salt and the compatibility with latex described in the following examples were measured by the following methods:

(1) Stability to common salt

A sample liquid was prepared by adding a quantity of the aqueous antimony oxide sol in concentration of 0.4% in terms of Sb, to an aqueous common salt solution of 1% concentration. After the passage of a prescribed time, the transmission of light of the sample liquid was measured. From the measured value, the stability was evaluated.

(2) Compatibility with latex

A quantity of the aqueous antimony oxide sol was added to a polyvinyl chloride latex (SUMIELITE 1010, solid matter content: 50%, produced by Sumitomo Chemical Co. Ltd.) so that the concentration could become 2.0% in terms of Sb. The state of the generation of aggregation and precipitation was observed, from which the compatibility with latex was evaluated.

EXAMPLE 1

A three-neck flask (one liter capacity) equipped with a stirrer was immersed in a thermostat at 90° C. Into this flask, water, $Sb_2O_3$ (concentration: 13 weight %; average particle diameter: $0.8\mu$) and an aqueous NaOH solution (conc.: 25 weight %) were charged. At the time point at which the temperature of the contents reached 50° C., an aqueous hydrogen peroxide solution (concentration: 35 weight %) was added, and the solution was caused to react for one hour.

In Table 1 below are shown the compounding ratio in the dispersion, particle diameter of $Sb_2O_{13}$ in the aqueous sol, percent transmission of light and chemical stability (percent transmission of light when 5% NaCl was added).

TABLE 1

| Run no. | Example 1 | | | | | Comparative Example | | | |
|---|---|---|---|---|---|---|---|---|---|
| | 1 | 2 | 3 | 4 | 5 | 6 | 7 | 8 | 9 |
| $Sb_2O_3$ conc. (wt. %) | 13 | 13 | 13 | 13 | 13 | 13 | 13 | 13 | 13 |
| $H_2O_2$ mol ratio | 1.25 | 1.3 | 1.5 | 1.7 | 1.5 | 1.2 | 1.9 | 1.5 | 1.5 |
| NaOH mol ratio | 0.1 | 0.1 | 0.1 | 0.1 | 0.015 | 0.1 | 0.1 | 0 | 0.5 |
| Particle diameter (m$\mu$) | 1–30 | 1–20 | 1–20 | 1–20 | 40–100 | 100–300 | 1–20 | 500–1000 | 500–1000 |
| Transmission (%) | 82 | 92 | 93 | 92 | 68 | 29 | 91 | 10> | 10> |
| Chemical stability (%) | 80 | 88 | 78 | 71 | 66 | 26 | 36 | 10> | 10> |

As seen in the above Table 1, the particle diameter of $Sb_6O_{13}$ in all run numbers of Example 1 is very small and the sol has excellent chemical stability. But in Run No. 6 of Comparative Example in which the $H_2O_2$ mol ratio is small, the particle diameter is large and the chemical stability is bad. In Run No. 7 in which $H_2O_2$ mol ratio is large, the particle diameter is small but the chemical stability is bad. Both in Run No. 8 in which NaOH is not added and in Run No. 9 in which NaOH mol ratio was large, the particle diameter is extremely large. The particle diameter of a commercially available aqueous $Sb_2O_5$ sol (produced by Nyacol; concentration: 50 weight %) was 20–50 m$\mu$, but the chemical stability was less than 10%.

EXAMPLE 2

In Run No. 3 of Example 1 and in Run No. 9 of Comparative Example, the concentration of $Sb_2O_3$ was changed. The results are shown in Table 2.

TABLE 2

| Run no. | Example 2 | | | | Comparative Example | | | |
|---|---|---|---|---|---|---|---|---|
| | 10 | 11 | 12 | 13 | 14 | 15 | 16 | 17 |
| $Sb_2O_3$ conc. (wt %) | 7 | 10 | 15 | 20 | 7 | 10 | 15 | 20 |
| $H_2O_2$ mol ratio | 1.5 | 1.5 | 1.5 | 1.5 | 1.5 | 1.5 | 1.5 | 1.5 |
| NaOH mol ratio | 0.1 | 0.1 | 0.1 | 0.1 | 0.5 | 0.5 | 0.5 | 0.5 |
| Particle diameter (m$\mu$) | 1–20 | 1–20 | 1–20 | 1–20 | 20–50 | 20–50 | 500–1000 | 500–1000 |
| Transmission (%) | 93 | 93 | 90 | 82 | 82 | 59 | 25 | 10> |
| Chemical stability (%) | 88 | 88 | 86 | 78 | 52 | 48 | 10> | 10> |

As apparent from Table 2, even when the concentration of $Sb_2O_3$ was increased, the particle diameter was small and the chemical stability was excellent.

EXAMPLE 3

The organic silicon compounds shown in Table 3 were each added in 5% quantity (as against Sb) to the aqueous $Sb_6O_{13}$ sol of Run no. 3 of Example 1. The mixture was caused to react at 85° C. for one hour under stirring, and then the pH was regulated to 7 with triethanol amine.

The stability to common salt (after the passage of 30 minutes) of the resulting products (particle diameter: 1–20 m$\mu$) was evaluated. The results are shown in Table 3 together with the value of the untreated product.

TABLE 3

| Run No. | Example 3 | | | | | | | Comparative Example | | | |
|---|---|---|---|---|---|---|---|---|---|---|---|
| | 18 | 19 | 20 | 21 | 22 | 23 | 24 | 25 | 26 | 27 | 28 |
| Organic silicon compound | (a) | (b) | (c) | (d) | (e) | (f) | (g) | (h) | (i) | (j) | — |
| Transmission, % | 97 | 95 | 92 | 96 | 87 | 97 | 93 | 15 | 25 | 8 | 22 |

Note:
(a) $CH_3Si(OCH_3)_3$
(b) $CH_3Si(OC_2H_5)_3$
(c) $CH_2\!\!=\!\!CHSi(OCH_3)_3$
(d) $CH_2\!\!=\!\!CHSi(OOCCH_3)_3$
(e) $CH_2\!\!=\!\!CHSi(OC_2H_4OCH_3)_3$
(f) $CH_2\!\!-\!\!CH\!\!-\!\!CH_2OC_3H_6Si(OCH_3)_3$
　　　\　/
　　　O
(g) $CH_2\!\!-\!\!CH\!\!-\!\!CH_2OC_3H_6Si(OC_2H_5)_2$
　　　\　/　　　　　　　　　　|
　　　O　　　　　　　　　　 $CH_3$ (h) 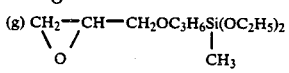—$NHC_3H_6Si(OCH_3)_3$ (i) $HSC_3H_6Si(OCH_3)_3$
(j) $CH_3SiCl_3$ From Table 3, the improvement effect on the stability to common salt of the products of this invention can be clearly understood.

EXAMPLE 4

In the same way as in Example 3 (Run No. 18), an aqeous $Sb_6O_{13}$ sol (No. 29) treated with the organic silicon compound was produced. Then the sol was regulated to various pH values with an aqueous 5% caustic soda solution, and the stability to common salt (after the passage of 30 minutes) of these samples obtained was evaluated. The results are shown in Table 4.

TABLE 4

| Run no. | 29 | 30 | 31 | 32 | 33 | 34 |
|---|---|---|---|---|---|---|
| pH | 2.2 | 3 | 5 | 6 | 9 | 12 |
| Transmission (%) | 42 | 64 | 81 | 89 | 85 | 77 |

From the above Table 4, it is understood that the stability to common salt was remarkably improved by pH regulation.

EXAMPLE 5

Samples were produced in the same way as in Example 3 (no. 18) except that the treating quantity of the organic silicon compound was changed as described in Table 5.

The results of the evaluation of the stability to common salt (after the passage of 3 minutes and 30 minutes) are shown in Table 5.

TABLE 5

| Run no. | | | 35 | 36 | 37 | 38 | 39 | 40 | 41 |
|---|---|---|---|---|---|---|---|---|---|
| Treating quantity (%) (as against Sb) | | | 1.0 | 2.0 | 3.0 | 5.0 | 10.0 | 20.0 | 25.0 |
| T (%) | After 3 min. | No pH regulation | 31 | 32 | 40 | 65 | 93 | 96 | 96 |
| | | pH 7 | 72 | 75 | 81 | 86 | 96 | 97 | 97 |
| | After 30 min. | No pH regulation | 23 | 24 | 26 | 30 | 93 | 95 | 96 |
| | | pH 7 | 54 | 56 | 59 | 64 | 96 | 97 | 97 |

From the above Table 5, it is understood that the stability to common salt is remarkably improved by treatment with the organic silicon compounds of a quantity within the range recommended in this invention and by pH regulation, and also that the improvement effect reaches the top even if the treating quantity is increased beyond necessity.

EXAMPLE 6

Samples were produced in the same way as in Example 3 (no. 18) except that the treating quantity was changed as described in Table 6. The results of evaluation of the compatibility with latex are shown in Table 6.

TABLE 6

| Run no. | Treating quantity, % (as against Sb) | Compatibility with latex |
|---|---|---|
| 42 | 0 | After 2 minutes, aggregation occured and precipitation came out. |
| 43 | 1.0 | After 30 minutes, some aggregation occurred and precipitation came out. |
| 44 | 4.0 | After 24 hours, no aggregation occurred. |

TABLE 6-continued

| Run no. | Treating quantity, % (as against Sb) | Compatibility with latex |
| --- | --- | --- |
| 45 | 10.0 | After 24 hours, no aggregation occurred. |

From the above Table 6, it is clearly understood that the products of this invention have an improvement effect on the compatibility with latex.

EXAMPLE 7

The aqueous $Sb_6O_{13}$ sol of Example 1 (no. 3) and the organic silicon compound-treated aqueous $Sb_6O_{13}$ sol described in Example 3 (No. 18) were each continuously introduced into an aqueous 50% sodium thiocyanate solution of an acrylonitrile copolymer (polymer conc.: 10%) composed of 82.7% acrylonitrile (AN), 9% vinylidene chloride, 8% methyl acrylate and 0.3% sodium methallyl sulfonate so that each of the aqueous sols could become 5% for the weight of the copolymer. By using a Pipe Line Mixer (produced by Tokushukikako Co.) as the stirrer and by mixing and stirring, acrylic spinning solutions in which the antimony oxide particles were dispersed finely and uniformly were obtained continuously and stably. Each of the thus obtained spinning solutions was spun into an aqueous 13% sodium thiocyanate solution to form fibers. In the usual way, the fibers were subjected to water-washing, stretching, drying and heat treatment, and 10 denier fibers were obtained.

The knit LOI value of the thus obtained fibers was both 24.5, and there was no devitrification. The dyed color clearness was also good.

On the other hand, the knit LOI value of the 10 d fibers obtained in the same way as above except that a spinning solution in which the aqueous $Sb_6O_{13}$ sol was not introduced, was 21.0. The knit LOI value of the fibers to which vinylidene chloride and $Sb_6O_{13}$ were not added and 91.7 weight % AN was used, was 18.0.

The above-mentioned knit LOI value is obtained as follows:

In the usual way, 10 denier fibers are made into a thread of 1/10'S. The thread is produced into a plain stitch knit fabric of the weight of 300 g/m². This fabric is measured according to JIS K-7201 to obtain the knit LOI value.

What we claim is:

1. An aqueous antimony oxide sol characterized in that particles of hexaantimony tridecaoxide having particle diameters from 1 to 100 m$\mu$ are dispersed in an aqueous medium.

2. The aqueous antimony oxide sol as claimed in claim 1 obtained by heating an aqueous dispersion of antimony trioxide, hydrogen peroxide and an alkali-metal compound selected from lithium hydroxide, sodium hydroxide, lithium carbonate and sodium carbonate, mixed in the mol ratio of 1:1.25–1.8:0.015–0.30.

3. The aqueous antimony oxide sol as claimed in claim 1 obtained by treating hexaantimony tridecaoxide with an organic silicon compound represented by the general formula described below, in the ratio of 0.5–25 weight % based on Sb and by regulating the pH to within the range of from 2.5 to 12:

the general formula:

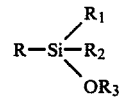

wherein R represents a $C_{1-8}$ substituent group which contains no amino group, mercapto group, methacryloxy group or halogen atom; $R_1$ and $R_2$ each represent a $C_{1-4}$ substituent group; $R_3$ represents a $C_{1-4}$ alkyl group, alkoxy-substituted alkyl group or an acetyl group.

4. The aqueous antimony oxide sol as claimed in claim 3 wherein the substituent group R is a vinyl group or a $C_{1-4}$ lower alkyl group.

5. The aqueous antimony oxide sol as claimed in claim 3 wherein the substituent groups $R_1$ and $R_2$ are each the same or a different $C_{1-2}$ alkoxy group or acetyl group.

6. The aqueous antimony oxide sol as claimed in claim 3 which is pH-regulated with a hydroxy group-containing organic amine.

* * * * *